US 6,608,307 B1

(12) United States Patent
Baur (10) Patent No.: US 6,608,307 B1
(45) Date of Patent: Aug. 19, 2003

(54) SYSTEM AND METHOD FOR ACCURATE POSITIONING OF A SCANNING PROBE MICROSCOPE

(75) Inventor: Christof Baur, Dallas, TX (US)

(73) Assignee: Zyvex Corporation, Richardson, TX (US)

(*) Notice: Subject to any disclaimer, the term of this patent is extended or adjusted under 35 U.S.C. 154(b) by 0 days.

(21) Appl. No.: 10/184,181

(22) Filed: Jun. 27, 2002

(51) Int. Cl.[7] ............................................... H01J 37/26
(52) U.S. Cl. ...................................... 250/306; 250/307
(58) Field of Search ............................. 250/306, 307; 73/105

(56) References Cited

U.S. PATENT DOCUMENTS

| | | | | |
|---|---|---|---|---|
| 4,263,527 A | * | 4/1981 | Comstock | 310/316.03 |
| 4,343,993 A | * | 8/1982 | Binnig et al. | 250/306 |
| 5,077,473 A | * | 12/1991 | Elings et al. | 250/306 |
| 5,081,390 A | * | 1/1992 | Elings | 310/328 |
| RE34,331 E | * | 8/1993 | Elings et al. | 250/306 |
| 5,705,741 A | * | 1/1998 | Eaton et al. | 73/105 |
| 5,744,799 A | * | 4/1998 | Ohara | 250/306 |
| 6,288,391 B1 | * | 9/2001 | Ushioda et al. | 250/307 |

OTHER PUBLICATIONS

Pohl, et al. "Tracking" tunneling microscopy, Jun. 1988, Rev. Sci. Instrum, vol. 59, Edition 6, pp. 840–842.*
Pohl, D. et al., "'Tracking' Tunneling Microscopy," Rev. Sci. Instrum. V59, P. pp. 840–842, Jun. 1988.
Aketagawa, M. et al., "Tracking and Stepping Control of the Top Position of Scanning Tunnel Microscope by Referring to Atomic Points and Arrays on a Regular Crystalline Surface," Rev. Sci. Instrum. V70, pp. 2053–2059, 1999.
Swartzentruber, B. "Direct Measurement of Surface Diffusion Using Atom–Tracking Scanning Tunneling Microscopy," Phys. Rev. Letters, vol. 76, No. 3, pp. 459–462, Jan. 15, 1996.
Huang W. et al., "Time–Stability Measurement and Compensation of Scanning Probe Microscope Instrument," J. Vac. Sci. Technol. B 18(4), pp. 2027–2029, 2000.
Desogus, S. et al., "Capactive Sensors Coupled to a Scanning Tunneling Microscope Piezoscanner for Accurate Measurement of the Tip Displacements," J. Vac. Sci. Technol. B 12(3), pp. 1665–1668, 1994.
Ito, K. et al., "Servomechanism for Locking Scanning Tunneling Microscope Tip over Surface Nanostructures," Review of Scientific Instruments, vol. 71., No. 2, pp. 420–423, Feb. 2000.
Staub, R. et al., "Drift Elimination in the Calibration of Scanning Probe Microscopes," Rev. Sci. Instrum, 66(3), pp. 2513–2516, Mar. 1995.
Kolb., P. et al., "Capacitive Sensor for Micropositioning in Two Dimensions," Rev. Sci. Instrum. 69 (1), pp. 310–312, Jan. 1998.
Deck, L., "Accurate, Repetitive, Linear Motion from Biased Piezoelectric Actuators," Rev. Sci. Instrum. 66(5), pp. 3204–3207, May 1995.

* cited by examiner

Primary Examiner—John R. Lee
Assistant Examiner—Christopher M. Kalivoda
(74) Attorney, Agent, or Firm—Fulbright & Jaworski L.L.P.

(57) ABSTRACT

A system and method provide three-dimensional real time stabilization of the gap between probe tip and sample in a scanning probe microscope (SPM) against creep and drift. Supplemental signals in each axis provide supplemental movement to the probe tip to offset drift. The supplemental signals can be applied simultaneously or sequentially in any combination of axes. Typically the supplemental signals are determined from calculated drift predictions, based on drift measurements inferred from feedback in response to the gap-dependent strength of an interaction between probe and sample. Waveform modulation is coupled into the drive circuitry for each axis, and a waveform-synchronous feedback signal is extracted and processed to measure drift. The waveform modulations can be identical or asynchronous and applied sequentially or simultaneously in any combination of axes. An algorithm performs the process in real time.

23 Claims, 4 Drawing Sheets

SYSTEM AND METHOD FOR ACCURATE POSITIONING OF A SCANNING PROBE MICROSCOPE

TECHNICAL FIELD

The present invention relates to the field of high accuracy real-time positioning and more particularly to real-time three-dimensional positioning of a scanning probe microscope with sub-micron scale accuracy.

BACKGROUND OF THE INVENTION

Figure 1A:
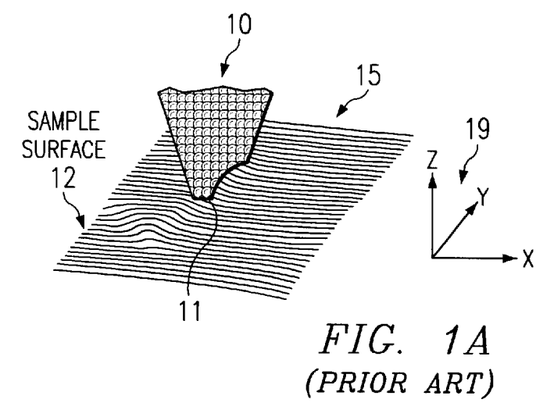
FIGS. 1A and 1B illustrate schematically a typical prior art SPM setup.
Figure 1B:
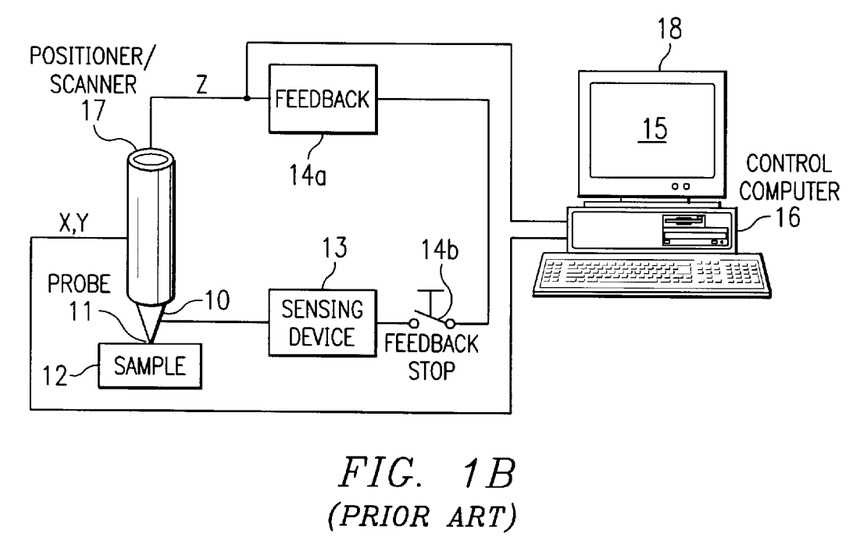

The invention presented here is in the field of scanning probe microscopy (SPM) and addresses the correction of unwanted deviations of the probe position. FIGS. 1A and 1B illustrate schematically a typical prior art SPM setup. Probe tip 10 sharpened to apex 11 often of atomic scale dimensions is brought into close proximity with sample surface 12, until sensing device 13 detects a desired local interaction between apex 11 and sample surface 12. For scale, the rounded features in probe tip 10 represent typical sizes of individual atoms of the probe. Scanning probe tip 10 across sample surface 12 while keeping the interaction strength constant by means of feedback loop 14a optionally including feedback stop 14b to interrupt the feedback signal, generates a contour map of constant probe—sample interaction strength, for example contour lines 15 representing constant interaction scans of probe apex 11 over sample surface 12 in FIG. 1A. Contour map 15 can typically be displayed on monitor screen 18.

In FIG. 1A are shown X, Y, and Z axes 19, which define a coordinate system accepted as conventional in the art. X and Y axes are any two convenient intersecting axes in an XY plane substantially parallel to sample surface 12, whereas Z is a vertical axis intersecting the XY plane that measures height above sample surface 12. The scan pattern of probe 10 over sample surface 12 is conventionally always taken to be in the XY plane, but can be rotated at any angle within the XY plane.

Holding the tip at a fixed location in X, Y and Z with the feedback stop activated is necessary to measure the influence of other parameters on the previously mentioned interactions. Tunneling spectroscopy, which determines the tunneling current as a function of tunneling voltage, is one example.

Examples of localized interactions or processes and the corresponding microscope instruments are: electron tunneling (scanning tunneling microscope, STM), van der Waals and atomic repulsive forces (atomic force microscope, AFM) and capacitive displacement currents (capacitance microscope). In STM and AFM the acquired map or image 15 will reveal detailed surface structure, in some cases with atomic scale resolution. This high resolution mandates mechanically stiff construction and high accuracy probe positioning capabilities, represented by control computer 16 and positioner/scanner 17.

Stability requirements are even more severe for tunneling spectroscopy: decreasing the distance between tip and sample by only 10 pm (one hundred-thousandth of a micrometer) will, under typical conditions, increase the tunneling current by approximately 25 per cent. Similar severe deviations exist for other measurements, which are performed with the feed back stopped. Therefore, mechanically stabilizing the gap between tip and sample is very important.

No prior art method to actively stabilize the distance between tip and sample with a stopped feedback has been described. Hence, scientists and other SPM users who depend on gap stability are forced to work at cryogenic temperatures. Cyrogenic environments require complex and expensive equipment. Furthermore, some environments, e.g. liquids and gases other than helium, are not compatible with ultra-low temperatures. Prior art is limited to tracking of features, corrections in X and Y to improve image acquisition, and post acquisition data processing.

U.S. Pat. No. 5,077,473 (hereinafter the '473 patent) issued Dec. 31, 1991 to Elings et al., the disclosure of which is hereby incorporated herein by reference, describes prior art techniques to control the XY position of the probe tip of a scanning probe microscope (SPM). The rate of error is determined and is used to obtain a prediction for the needed supplemental signals and then a real time compensation. The inventors cite a technical publication by Pohl et al., "Tracking" Tunneling Microscopy, Rev. Sci. Instrum. V59, p. 840 (1988), describing tracking of very small features of a sample, but do not suggest that automated tracking can be used to determine drift rates. Pohl et al. suggests to oscillate the tip of an STM in a circular pattern and apply a lock-in technique to derive the sample slope in X and Y directions from the tunneling current. The X and Y offsets are continuously adjusted to move the tip to the highest (or lowest) point on the sample and thereby lock the tip onto the target extremity. Pohl et al. comments that their tracking method reveals drift and fluctuations. A similar scanning tunneling microscope setup has been used by Aketagawa et al., "Tracking and Stepping Control of the Tip Position of Scanning Tunneling Microscope by Referring to Atomic Points and Arrays on a Regular Crystalline Surface," Rev. Sci. Instrum. V70, p. 2053 (1999), to lock the STM tip onto an atom of a graphite sample surface used in their experiment. Like Pohl et al., they limit their discussions to the X and Y coordinates and do not use the obtained drift signals for real time error compensation.

In the prior art, users were not concerned with compensating in the direction normal to the sample surface (Z). They were primarily concerned with imaging applications showing surface details, but not necessarily accurate height information. Most height errors were corrected in the case of imaging by subsequent image processing, e.g., background subtraction, without requiring real time processing. For molecular, atomic or other nanoscale manipulation carried out with an SPM, especially when the Z-feedback has to be disabled during manipulation, deviations in tip-sample distance can lead to complete failure. If for example the tip of an STM is brought closer to the sample surface by only 0.1 nm, the tunneling current will increase by an order of magnitude under typical experimental conditions. The resulting extremely high fields and current densities will often lead to destruction of the tip or of the sample in the area opposing the tip apex, where the atom, molecule, or nanostructure to be manipulated is located. If, on the other hand, the tip is withdrawn, current densities and fields diminish, and the target object may not be manipulated at all. Accordingly, the parameter window for successful manipulation is often narrow, as indicated by the fact that only very robust molecules, for example carbon monoxide, have to date been picked up with the probe of an SPM, and then only at cryogenic temperatures.

Some measurements carried out with SPMs require that the Z feedback be disabled. Tunneling spectroscopy force-distance curves and measurements of the tunneling current as a function of tip-sample distance are examples. Typically, the relationship between the measured quantity and tip-sample distance is very complex, and post-acquisition data processing cannot be used to correct errors due to deviations of the tip-sample distance.

Accordingly, it is desired in the art to develop a system and method to stabilize and accurately control the position of a SPM probe three dimensionally in real time.

BRIEF SUMMARY OF THE INVENTION

The present invention is directed to a system and method which extend the two-dimensional prior art to provide three-dimensional real time stabilization of the gap between probe tip and sample in a scanning probe microscope (SPM) against drift. The method applies supplemental signals to each of up to three mutually intersecting axes to provide supplemental movement to the probe tip in each axis to offset drift motion relative to a sample. The supplemental signals can be applied simultaneously or sequentially in any combination in the respective axes. In embodiments of the invention, the supplemental signals are determined in response to calculated drift predictions, based in turn on drift measurements inferred from measurement and feedback in response to the gap-dependent strength of an interaction between the probe and the sample. In some embodiments, a waveform modulation is coupled into the drive circuitry for one or more of the axes, and a waveform-synchronous feedback signal is extracted and processed to measure drift. The waveform modulations can be identical or asynchronous and applied sequentially or simultaneously in any combination to the axes. An algorithm performs the process in real time.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying FIGURES. It is to be expressly understood, however, that each of the FIGURES is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

In the above drawing, similar reference numbers have been assigned to the same or similar elements in different figures.

DETAILED DESCRIPTION OF THE INVENTION

SPMs are commonly used for imaging (in which XY error compensation parallel to the sample surface is sufficient). Embodiments of the present invention broaden the uses of SPMs to enhance manipulation operations, tunneling spectroscopy, and other measurements in which compensation of the "gap" between tip and sample in three dimensions becomes important. Although the terms "microscope," "SPM," "STM," and "microcomponent" nominally refer to structures having micron scale dimensions, they are understood herein to apply also to structures and manipulations occurring at submicron scale dimensions.

Scanning Probe applications which rely on a stable relative position of probe and sample are often severely compromised by positional errors of the Scanning Probe Microscope (SPM). Prior art describes error compensation in directions parallel to the sample surface only and therefore cannot be used to stabilize the gap in three dimensions. This invention is directed to a real time method to compensate errors that otherwise lead to variations of the gap between probe and sample of a SPM, especially the distance between tip and detail or feature on the sample surface. This is essential for measurements and processes like tunneling spectroscopy and molecular manipulation that are sensitive to gap instabilities.

The '473 patent, cited above, the disclosure of which has been incorporated herein by reference, discloses that the "scan pattern is positioned in at least two perpendicular dimensions." The scan pattern is always substantially parallel to the XY plane, and as such can be rotated about the Z axis, i.e., in the XY plane. There is no scan in the XZ, YZ or any other plane except the XY plane. The '473 patent describes a method to compensate position errors in the two-dimensional XY scan plane, but does not describe any method suitable to compensate errors in three dimensions associated with the gap between probe tip and sample.

Figure 2A:
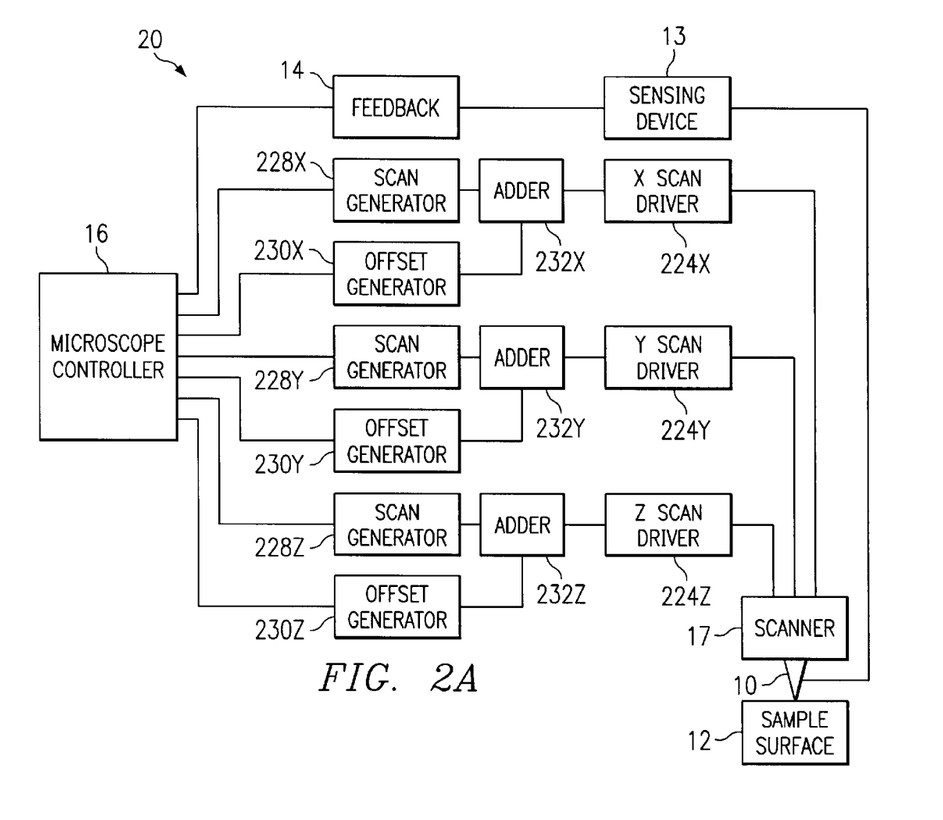
FIG. 2A is a simplified block diagram representing a system that provides for three-dimensional gap stabilization in scanning probe microscopes (SPMs) and the like, in accordance with embodiments of the present invention.

FIG. 2A is a simplified block diagram representing system 20, which provides for three-dimensional gap stabilization in scanning probe microscopes (SPMs) and the like, in accordance with embodiments of the present invention. In the implementation depicted by system 20, independent supplemental motion is superimposed on the conventional scanning motion in each of the three X, Y, and Z intersecting axes singly, pairwise, or simultaneously. The controlled, independent supplemental motion can be used for compensation of drift, for stabilization of probe tip-to-sample gap, and/or for the addition of any desired motion, for example sample tracking. In the general case, since the response of piezoelectric scanners is typically nonlinear, accurate generation of a given supplemental motion can require a complex scan drive waveform. Nevertheless, the disclosure below describes the supplemental motion in terms of a linear approximation, which is adequate for many situations and can readily be extended to the more general nonlinear case by those skilled in the art.

In system 20, each axis X, Y, and Z of probe positioner/scanner 17 uses two independently controllable position generators 228x, 228y, 228z and 230x, 230y, 230z respectively, whose outputs are summed by adders 232x, 232y, and 232z respectively before inputting into respective X, Y, and Z scan drivers 224x, 224y, and 224z. One implementation (not shown) of generators 228x–228z and drivers 230x–230z in a typical single axis of system 20 is described in connection with FIG. 3 of the '473 patent, cited above. Those skilled in the art will recognize alternative implementations of the principles of the present invention, depending on particular system requirements.

In the case of a raster scan image, it is convenient to think of the position generators on each axis X, Y, Z, for example position generators 228x and 230x, as scan and offset, respectively, although they can be used independently for any probe positioning pattern. Scan generators 228x and 228y, for example, can be driven with the appropriate waveforms for a raster, and offset generators 230x and 230y can be driven at an independent, often slower rate to position the entire raster pattern. Offset generators 230x, 230y and 230z, for example, can be driven independently with waveforms computed by microscope computer 16, to add constant and/or time variable velocity motion. The offset can be changed either continuously or discontinuously, for example at the end of a scan line. In other probe positioning operations, such as step and dwell for current/voltage measurements at a particular position, scan generators 228x–228z can be used for three-dimensional probe positioning, and offset generators 230x–230z can be used to move probe 10 independently in the X, Y, and Z axes to track a sample and/or to compensate for unwanted drift in three dimensions. In some special embodiments, supplemental motion is applied in only the X and Y directions, and the feedback is the standard Z axis feedback that already exists in any SPM controller.

Figure 2B:
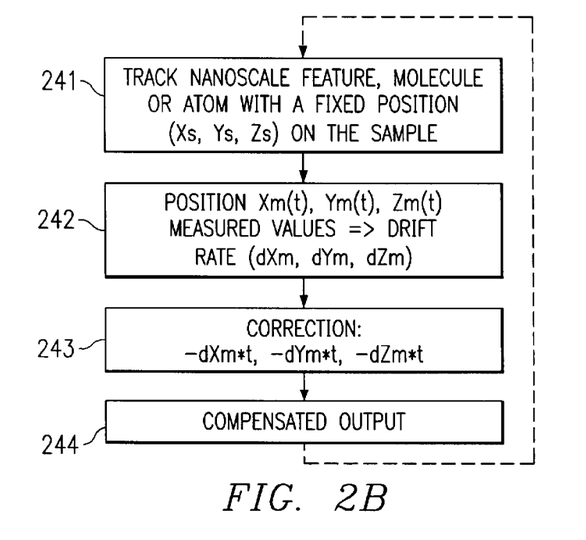
FIG. 2B is a flow diagram depicting the operation of an algorithm for determining three-dimensional drift velocity to first order, in accordance with embodiments of the present invention.

Various methods of drift determination and compensation for SPMs in the two-dimensional XY plane are described in the '473 patent, cited above. Real time three-dimensional drift compensation in accordance with embodiments of the present invention can be implemented using system 20 illustrated above in FIG. 2A in conjunction with a means of determining the drift velocity. FIG. 2B is a flow diagram depicting the operation of an algorithm for determining three-dimensional drift velocity to first order, in accordance with embodiments of the present invention. The linear approximation of FIG. 2B is adequate for many applications and can readily be extended to more complex higher order drift and/or creep estimations by those having skill in the art. At step 241, using system 20 the initial three-dimensional position (Xs, Ys, Zs) of a nanoscale (atomic scale) feature, molecule, or atom is measured. At step 242 at a later time t, a new three-dimensional position Xm(t), Ym(t), Zm(t) of the same feature, molecule, or atom is measured, yielding a first order measured three-dimensional drift rate (dXm, dYm, dZm). At step 243, a first order three-dimensional drift correction (−dXm*t, −dYm*t, −dZm*t) is calculated by microscope controller 16 from the three-dimensional drift rate measured at step 242 and the time delay t. At step 244, the calculated drift correction components are added to the corresponding previous scanner axis drive components to generate compensated output components, which are then applied at step 241 to continuing three-dimensional tracking of the nanoscale feature to be studied or manipulated. The algorithm of FIG. 2B can be performed iteratively and manually or automatically to provide substantially real time first-order three-dimensional gap stabilization and/or drift/creep compensation.

Tracking of samples in the XY plane using a scanning tunneling microscope (STM) is described in Pohl and Möller, "Tracking" Tunneling Microscopy, Rev. Sci. Instr. v59, no. 6, pp. 840–842, June 1988. A conventional scanning circuit is used for the STM. Additional modulation is applied on an XY electrode to dither the probe tip circularly in the XY plane, generating feedback from the tunneling current while maintaining constant tunneling voltage. The feedback signal is filtered at the dither frequency through a lock-in amplifier, which outputs a signal in response to the dither-synchronous component of the tunneling current, which is then recorded in a controller and feedback module. By combining the feedback signals in various ways, the technique can be adapted to tracking sample features by seeking either a maximum or a depression in the tunneling current signal associated with those features. The scanning probe tip can effectively lock onto a sample feature. Alternatively the technique can be adapted to follow contours of constant tunneling current in the sample surface. A two-dimensional application of this feature tracking capability is demonstrated in Swartzentruber, "Direct Measurement of Surface Diffuision Using Atom-Tracking Scanning Tunneling Microscopy," Phys. Rev. Letters, Vol. 76, No. 3, pp. 459–462 (Jan. 15, 1996). This tracking in XY is demonstrated on the atomic scale for recording only, and has not been applied to any type of drift compensation.

Figure 3A:
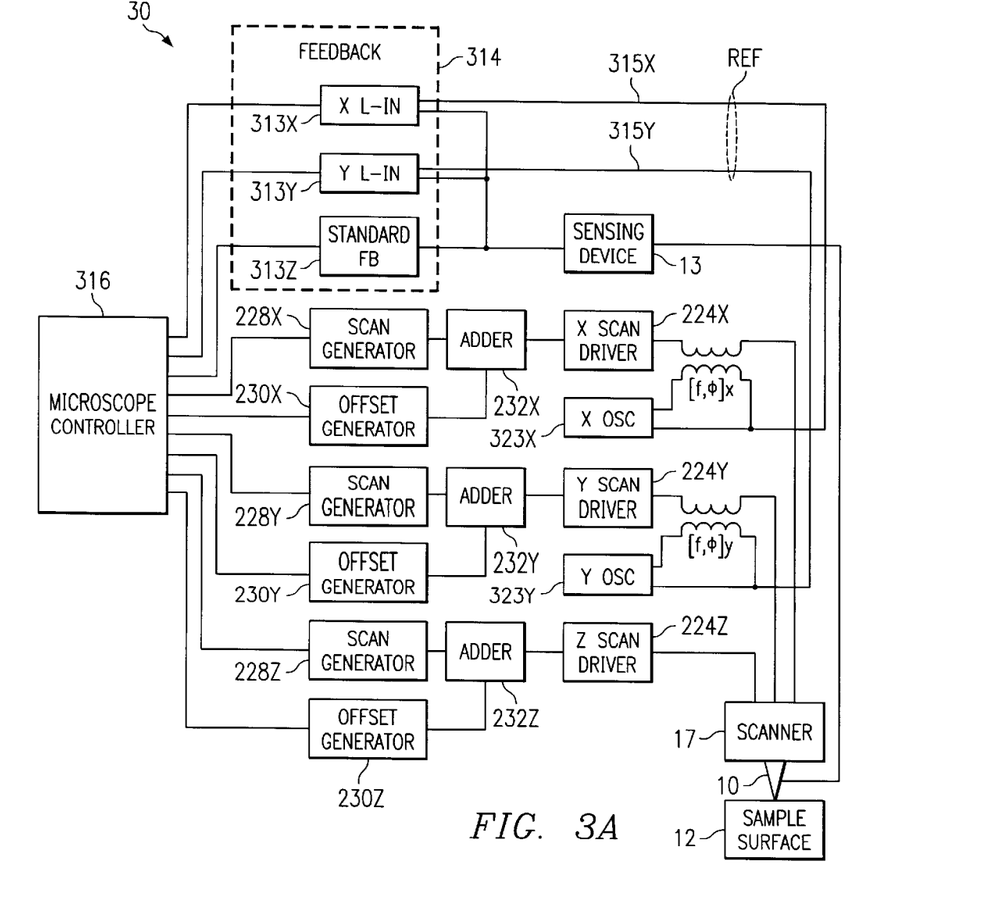
FIG. 3A is a block diagram representing an implementation of the system of FIG. 2A incorporating modulation elements.
Figure 3B:
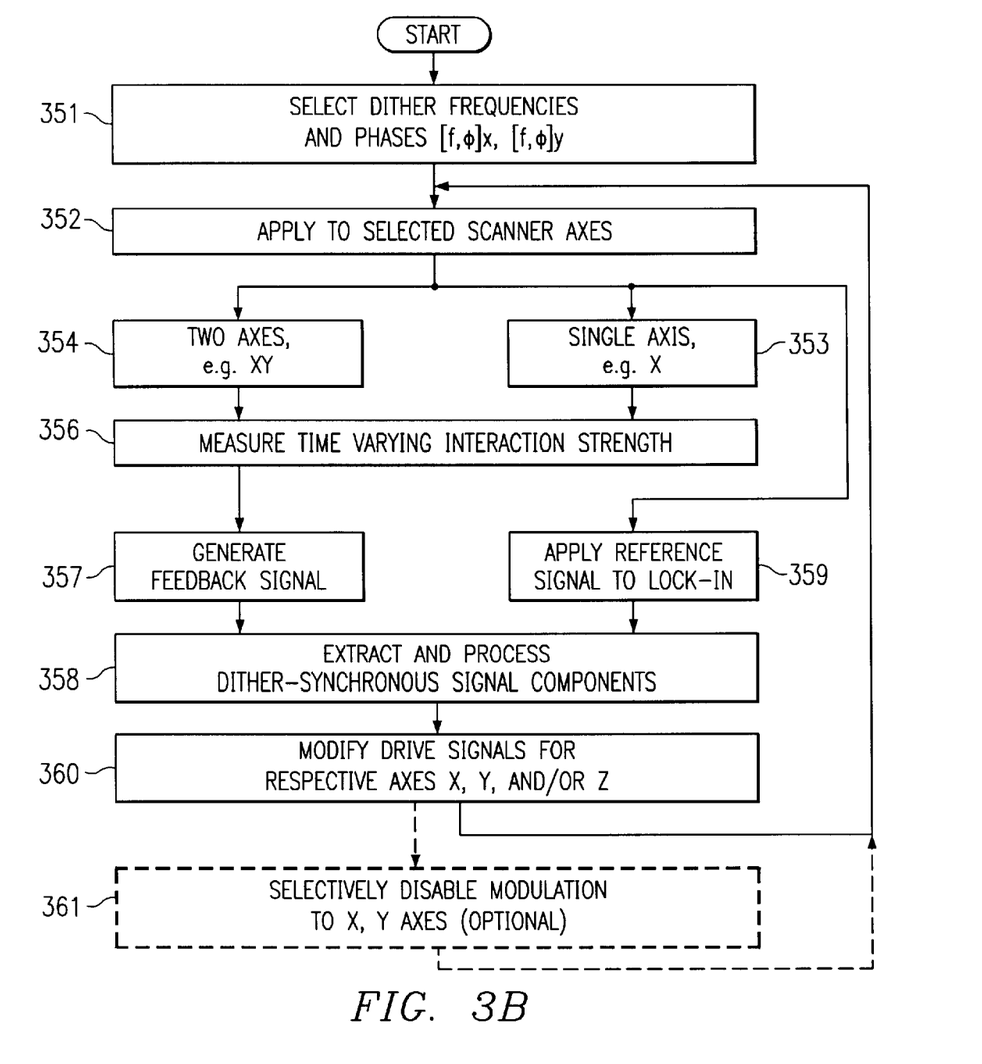
FIG. 3B is a flow diagram depicting the operation of the system of FIG. 3A.

A variety of analogous methods can be extended to feature tracking and/or drift compensation for gap stabilization in the third Z axis. FIG. 3A is a block diagram of system 30 representing an implementation of system 20 of FIG. 2A incorporating modulation elements as described in Pohl, et al. (1988), cited above. FIG. 3B is a flow diagram depicting the operation of system 30. At steps 352–354 the drive signals from respective X and Y scan drivers 224x, 224y are modulated by signals from respective X and Y oscillators 323x, 323y, having respective frequencies and phases [f, φ]x, [f, φ]y selected in step 351. The modulated drive signals are applied to the corresponding piezoelectric electrodes of probe scanner 17, which dithers probe tip 10 in up to two dimensions relative to sample surface 12. At step 357 sensing device 13 generates a feedback signal in response to the time-dependent interaction strength between probe tip 10 and sample surface 12 measured at step 356. The feedback signal from sensing device 13 contains time-dependent components synchronous with respective modulation frequencies and phases [f, φ]x, [f, φ]y, which are individually extracted, processed by respective X and Y lock-in amplifiers 313x, 313y, and standard feedback amplifier 313z in feedback module 314, and outputted to microscope controller 316 at step 358. Reference signals 315x, 315y are supplied to respective lock-in amplifiers 313x, 313y from respective oscillators 323x, 323y at step 359.

At step 360, microscope controller 316 applies the lock-in output signals using conventional feedback and level comparison techniques to modify the drive signals from scan drivers 224x, 224y, and 224z to stabilize probe tip 10 and/or to compensate for drift in three dimensions in real time. In the general case, oscillators 323x, 323y each generate distinct asynchronous frequencies and phases. In some implementations, at least two of the oscillators can generate the same frequency or can be combined into a single oscillator simultaneously generating two output signals having the same frequency but with a 90-degree relative phase shift. The modulations can be applied temporally to each axis separately and sequentially, or to a combination of two axes simultaneously. For example, modulation in one axis can be disabled, while modulation is applied to achieve stabilization in the other axes. Modulation is optionally disabled in the stabilized axis as represented at step 361, and then modulation is applied to the remaining axis.

When locked onto a feature in the coordinate space of the sample, Xs, Ys, and Zs are each constant. Feedback signals Xm, Ym, Zm that the instrument uses to determine errors are then put into an empirical model to predict what drifts dXm, dYm, dZm will be compensated for before they happen. For example, to approach within 7 angstroms of a molecule or atom on the sample surface and to be positioned directly over it within a 7-angstrom distance begins by applying X and Y dithering voltages with 90-degree phase shift to cause the probe tip of the STM to circle until it locates the atom or molecule, based on feedback from the interaction. The process continues with locating and tracking the atom, adapting tracking techniques similar to those of Pohl, et al., (1988), cited above. When a feature is located and the probe tip is substantially directly over it, the circling is disabled, drift compensating signals $-dXm*t$, $-dYm*t$, $-dZm*t$ are applied in X, Y, and Z axes, and the probe tip remains over the feature. A Z-axis voltage is then applied manually using a predetermined scan calibration, to lower the probe tip by the desired 7 angstroms. Then there remains only a small residual change in the motion of the feature relative to the probe tip. That drift then, and not the initial gap of 7 angstroms, is compensated in embodiments of the present invention by predicting how much drift will occur.

In embodiments of the present invention, the feedback signal can be provided by sensing for example photon emission, piezoelectricity, electrochemical activity, local elasticity, or resistance rather than tunneling current. For example, when operated in a tracking mode, the probe tip could lock onto a position having higher photon emission than its surrounding, and can use drift compensation to stay in a fixed relationship to this position.

To stabilize the gap in X, Y and Z against drift, the voltage is adjusted over time to compensate for the computed drift rate, not only in the X and Y axes, but also in the Z axis. Using probe manipulation, for example to pick up an atomic scale sample from the surface, generally requires triggering a localized chemical reaction, which can be sensitive to tunneling current and therefore can benefit from three-axis gap stabilization.

Not only is three-dimensional gap stabilization beneficial for manipulation, but also for certain types of measurement in spectroscopy. In tunneling spectroscopy X, Y and Z are typically held constant, while ramping the tunneling voltage and measuring the tunneling current as a function of tunneling voltage. According to a thumb rule, under clean experimental conditions, for example, if the distance between tip and sample changes by one angstrom, the tunneling current between the sample and the tip will change by an order of magnitude. As a consequence, even a very small deviation of the tip-sample gap will lead to significant errors in the measured tunneling spectra. These errors can be reduced significantly by means of drift compensation, in accordance with embodiments of the present invention.

An alternative traditional technique to eliminate thermal drift is to cool the apparatus to near zero absolute temperature, where all expansion coefficients go to zero, so that drift is no longer an issue. All the measurements in tunneling spectroscopy where there are scientific breakthroughs have been made at cryogenic temperatures, typically 4 Kelvins. This approach, however, adds complex equipment and processing, and does not allow retrofit of existing room temperature SPMs. A completely new design is required to operate at low temperature. Additionally, many material properties are a function of temperature, mandating in many cases room temperature operation. The present algorithm, on the other hand, could easily be applied in software to existing instruments and implemented in software/hardware/firmware in any newer design SPM instruments.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. In a scanning probe microscope (SPM), a method of stabilization in real time of the gap separating probe tip and sample in at least two intersecting axes, at least one of said at least two intersecting axes being substantially non-parallel to the scan pattern of said SPM, said method providing supplemental movement in said at least two intersecting axes to said probe tip to offset drift motion of said probe tip relative to said sample, said method comprising the steps of:
   a. applying a first supplemental signal which provides supplemental movement in a first axis of said at least two intersecting axes to said probe tip in conjunction with a first positioning signal in said first axis of said at least two intersecting axes; and
   b. applying a second supplemental signal which provides supplemental movement in a second axis of said at least two intersecting axes to said probe tip in conjunction with a second positioning signal in said second axis of said at least two intersecting axes; wherein
   said steps of applying a first supplemental signal and applying a second supplemental signal include providing supplemental signals which provide a controlled movement of said probe tip that offsets drift motion of said probe tip relative to said sample in said at least two intersecting axes; and
   wherein said supplemental signals are determined in response to a topographic signal.

2. The method of claim 1 wherein said step of applying said second supplemental signal comprises applying said second supplemental signal simultaneously with said first supplemental signal.

3. The method of claim 1 wherein said first supplemental signal and said second supplemental signal are determined in response to predicted drift calculations.

4. The method of claim 3 wherein said predicted drift calculations are determined in response to a drift measurement.

5. The method of claim 4 wherein said drift measurement comprises the step of measuring the strength of a variable selected from the group consisting of photon emission, piezoelectricity, electrochemical activity, local elasticity, resistance, and interaction between said probe tip and said sample.

6. The method of claim 5 wherein said drift measurement further comprises the steps of:

modulating said first positioning signal with a first waveform modulation;

modulating said second positioning signal with a second waveform modulation;

applying said waveform modulated positioning signal to position said probe tip;

generating a feedback signal in response to a time-dependent strength of said variable resulting from modulated positioning of said probe tip in response to each of said waveform modulated positioning signals; and processing said feedback signal to obtain said drift measurement.

7. The method of claim 6 wherein said first waveform modulated positioning signal and said second waveform modulated positioning signal are applied simultaneously to position said probe tip.

8. The method of claim 6 wherein said first waveform modulation and said second waveform modulation are substantially identical.

9. The method of claim 6 wherein said first waveform modulation and said second waveform modulation are asynchronous.

10. The method of claim 1 wherein said at least two intersecting axes comprise three mutually intersecting axes, said method further comprising:

c. applying a third supplemental signal which provides supplemental movement in a third axis of said three mutually intersecting axes to said probe tip in conjunction with a third positioning signal in said third axis of said three mutually intersecting axes; wherein said steps of applying said first, second, and third supplemental signals include providing supplemental signals which provide a controlled movement of said probe tip that offsets drift motion of said probe tip relative to said sample in said three mutually intersecting axes.

11. The method of claim 10 wherein said step of applying said third supplemental signal comprises applying said third supplemental signal simultaneously with said first supplemental signal.

12. The method of claim 1 wherein said controlled movement of said probe tip offsets drift motion of said probe tip relative to said sample in real time.

13. A system for stabilization in real time of the gap separating probe tip and sample of a scanning probe microscope (SPM) in at least two intersecting axes, at least one of said at least two intersecting axes being substantially perpendicular to the scan pattern of said SPM, said system comprising:

a probe tip mounted in a probe scanner;

a sample operably associated with a sample surface, said sample separated by a gap from said probe tip;

a drive circuit operably connected with said probe scanner;

a first supplemental signal generator operable to provide supplemental movement in a first axis of said at least two intersecting axes to said probe tip in conjunction with a first positioning signal in said second axis of said at least two intersecting axes; and a second supplemental signal generator operable to provide supplemental movement in a second axis of said at least two intersecting axes to said probe tip in conjunction with a second positioning signal in said first axis of said at least two intersecting axes;

wherein said supplemental movement in said first axis and said second axis are not dependent on temperature compensation.

14. The system of claim 13 wherein said first and said second supplemental signal generator are operable to provide said first and said second supplemental movement simultaneously with one another.

15. The system of claim 13 wherein said first supplemental signal generator and said second supplemental signal generator are coupled with a processor operable to predict drift movement of said gap.

16. The system of claim 15 wherein said processor is coupled to a feedback circuit operable to provide a feedback signal in response to the measured strength of a variable selected from the group consisting of photon emission, peizoelectricity, electrochemical activity, local elasticity, resistance, and interaction between said probe tip and said sample.

17. The system of claim 16 further comprising:

a first waveform modulator coupled with said first supplemental signal generator and with said feedback circuit and operable to provide a first waveform modulation;

a second waveform modulator coupled with said second supplemental signal generator and with said feedback circuit and operable to provide a second waveform modulation; and a lock-in amplifier in said feedback circuit operable to extract time-dependent feedback signal components synchronous with said respective first and second waveform modulation in response to reference signals from said respective first and second waveform modulators.

18. The system of claim 13 wherein said at least two intersecting axes comprise three mutually intersecting axes, said system further comprising a third supplemental signal generator operable to provide supplemental movement in a third axis of said three mutually intersecting axes to said probe tip in conjunction with a third positioning signal in said third axis of said three mutually intersecting axes.

19. The system of claim 18 wherein said first and said third supplemental signal generators are operable to provide said first and said third supplemental movement simultaneously with one another.

20. The system of claim 18 wherein said first supplemental signal generator, said second supplemental signal generator, and said third supplemental signal generator are coupled with a processor operable to predict drift movement of said gap.

21. The method of claim 4 wherein said predicted drift calculations are determined in response to a topographic signal.

22. The system of claim 13 wherein said first supplemental signal generator and said second supplemental signal generator are coupled with a processor By operable to predict drift movement of said gap in response to a topographic drift measurement.

23. The system of claim 20 wherein said processor is operable to predict said drift movement in response to a topographic drift measurement.

* * * * *

UNITED STATES PATENT AND TRADEMARK OFFICE
CERTIFICATE OF CORRECTION

PATENT NO.     : 6,608,307 B1
DATED          : August 19, 2003
INVENTOR(S)    : Christof Baur It is certified that error appears in the above-identified patent and that said Letters Patent is hereby corrected as shown below:

<u>Title page, Item [54] and Column 1, lines 1-3,</u>
Title should be amended to read as follows: -- SYSTEM AND METHOD FOR GAP STABILIZATION IN SCANNING PROBE MICROSCOPES --

<u>Column 6,</u>
Line 19, please delete the word "Diffuision" and insert instead -- Diffusion --.

<u>Column 10,</u>
Line 57, please delete the word "By".

Signed and Sealed this

Sixth Day of April, 2004

JON W. DUDAS
*Acting Director of the United States Patent and Trademark Office*